United States Patent
Hartnagel et al.

(10) Patent No.: US 12,187,153 B2
(45) Date of Patent: Jan. 7, 2025

(54) SYSTEM FOR SELECTING ELECTRIC VEHICLE CHARGING POWER

(71) Applicant: FORD GLOBAL TECHNOLOGIES, LLC, Dearborn, MI (US)

(72) Inventors: William Hartnagel, Northville, MI (US); Ahthavan Raja Sureshkumar, LaSalle (CA); Justin Carmen Campanaro, Ferndale, MI (US); Robert Talbert, Plymouth, MI (US); Ryan Hunt, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 922 days.

(21) Appl. No.: 17/131,392

(22) Filed: Dec. 22, 2020

(65) Prior Publication Data
US 2022/0194255 A1 Jun. 23, 2022

(51) Int. Cl.
*B60L 53/66* (2019.01)
*B60L 53/64* (2019.01)
*B60L 53/65* (2019.01)
*G06Q 50/06* (2024.01)

(52) U.S. Cl.
CPC ............ *B60L 53/665* (2019.02); *B60L 53/64* (2019.02); *G06Q 50/06* (2013.01); *B60L 53/65* (2019.02)

(58) Field of Classification Search
CPC ........ B60L 53/665; B60L 53/64; B60L 50/06; B60L 53/65
See application file for complete search history.

(56) References Cited

U.S. PATENT DOCUMENTS

| | | | |
|---|---|---|---|
| 6,946,818 B2 | 9/2005 | Cawthorne et al. | |
| 9,656,567 B2 | 5/2017 | Kothavale et al. | |
| 10,836,273 B2* | 11/2020 | Zhu | B60L 53/20 |
| 10,953,765 B1* | 3/2021 | Sun | B60L 53/51 |
| 11,441,917 B2* | 9/2022 | Cun | B60L 53/62 |
| 11,673,483 B2* | 6/2023 | Sun | B60L 53/51 |
| | | | 320/109 |
| 2011/0004358 A1* | 1/2011 | Pollack | B60L 53/65 |
| | | | 700/297 |
| 2011/0016063 A1* | 1/2011 | Pollack | B60L 58/12 |
| | | | 320/155 |
| 2011/0153474 A1* | 6/2011 | Tormey | G06Q 30/04 |
| | | | 709/204 |

(Continued)

OTHER PUBLICATIONS

Tesla Model 3 owner's manual (See pp. 177-184); Feb. 2020; 259 pages.

*Primary Examiner* — Luis A Martinez Borrero
(74) *Attorney, Agent, or Firm* — David B. Kelley; Brooks Kushman P.C.

(57) ABSTRACT

A vehicle includes a traction battery, a human-machine interface (HMI), and a controller. The controller responsive to detecting electric vehicle supply equipment (EVSE) utilizing multiple price tiers corresponding to multiple maximum charge powers, outputs a message indicating a charge price corresponding to the maximum charge power for each of the price tiers via the HMI. The controller also, responsive to receiving user input indicating an adjusted maximum charge power less that a default maximum charge power of the vehicle, sends the adjusted maximum charge power to the EVSE and permits charging from the EVSE at or below the adjusted maximum charge power.

14 Claims, 3 Drawing Sheets

(56) References Cited

U.S. PATENT DOCUMENTS

| | | | |
|---|---|---|---|
| 2011/0191220 A1* | 8/2011 | Kidston | B60L 3/04 705/412 |
| 2012/0013301 A1* | 1/2012 | Gaul | B60L 3/12 320/109 |
| 2013/0110296 A1* | 5/2013 | Khoo | B60L 53/14 700/286 |
| 2013/0184886 A1* | 7/2013 | Pollack | B60L 53/64 700/291 |
| 2015/0042278 A1* | 2/2015 | Leary | B60L 1/02 901/30 |
| 2015/0149221 A1* | 5/2015 | Tremblay | B60L 53/305 320/109 |
| 2016/0082851 A1* | 3/2016 | Usuda | B60L 53/18 320/109 |
| 2016/0297316 A1* | 10/2016 | Penilla | G06Q 30/0232 |
| 2018/0111494 A1* | 4/2018 | Penilla | G06Q 20/145 |
| 2019/0294135 A1 | 9/2019 | Madrid et al. | |
| 2019/0383637 A1* | 12/2019 | Teske | B60L 53/67 |
| 2019/0389314 A1* | 12/2019 | Zhu | B60L 53/14 |
| 2019/0389315 A1* | 12/2019 | Zhu | B60L 53/64 |
| 2020/0009979 A1* | 1/2020 | Rodine | H04W 4/40 |
| 2020/0101850 A1* | 4/2020 | Harty | B60L 55/00 |
| 2020/0189406 A1* | 6/2020 | Kothavale | B60L 53/65 |
| 2020/0254896 A1* | 8/2020 | Lee | B60L 53/68 |
| 2020/0353839 A1* | 11/2020 | Tarchinski | B60L 53/62 |
| 2021/0046841 A1* | 2/2021 | Cun | B60L 53/62 |
| 2021/0138926 A1* | 5/2021 | Heyne | B60L 53/11 |
| 2022/0024335 A1* | 1/2022 | O'Gorman | H02J 7/00045 |
| 2022/0072975 A1* | 3/2022 | O'Gorman | B60L 53/00 |
| 2022/0085626 A1* | 3/2022 | Singh | B60L 53/62 |
| 2022/0161676 A1* | 5/2022 | Marlow | B60L 53/64 |
| 2022/0242261 A1* | 8/2022 | Tong | B60L 53/31 |
| 2022/0305936 A1* | 9/2022 | Koolen | B60L 53/60 |
| 2022/0333942 A1* | 10/2022 | Cun | B60L 53/68 |
| 2022/0348104 A1* | 11/2022 | Brannan | G05D 1/248 |
| 2022/0404165 A1* | 12/2022 | Teske | B60L 53/14 |

* cited by examiner

SYSTEM FOR SELECTING ELECTRIC VEHICLE CHARGING POWER

TECHNICAL FIELD

The present disclosure relates to a charging system for an electric vehicle.

BACKGROUND

Electric vehicles (EVs) may be charged at a charging station. Some charging stations charge at different prices per unit (rates) based on the maximum power of the vehicle charging. An EV having a higher maximum charging power may be charged a higher price per unit than another EV having a lower maximum charging power although the total amount of charge transferred to the two EVs are essentially the same.

SUMMARY

A vehicle includes a traction battery, a human-machine interface (HMI), and a controller. The controller, responsive to detecting electric vehicle supply equipment (EVSE) utilizing multiple price tiers corresponding to multiple maximum charge powers, outputs a message indicating a charge price corresponding to the maximum charge power for each of the price tiers via the HMI. The controller further, responsive to receiving user input indicating an adjusted maximum charge power less that a default maximum charge power of the vehicle, sends the adjusted maximum charge power to the EVSE and permits charging from the EVSE at or below the adjusted maximum charge power.

A method includes, in a presence of electric vehicle supply equipment (EVSE) utilizing multiple price tiers corresponding to multiple maximum charge powers, outputting a message indicating a charge price corresponding to the maximum charge power for each of the price tiers, receiving input indicating an adjusted maximum charge power less than a default maximum charge power, and permitting charging from the EVSE at or below the adjusted maximum charge power.

A charge system includes a controller to control charging from a charge station based on an adjusted maximum charge power less than a default maximum selected from a plurality of maximum charge powers available from the charge station.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
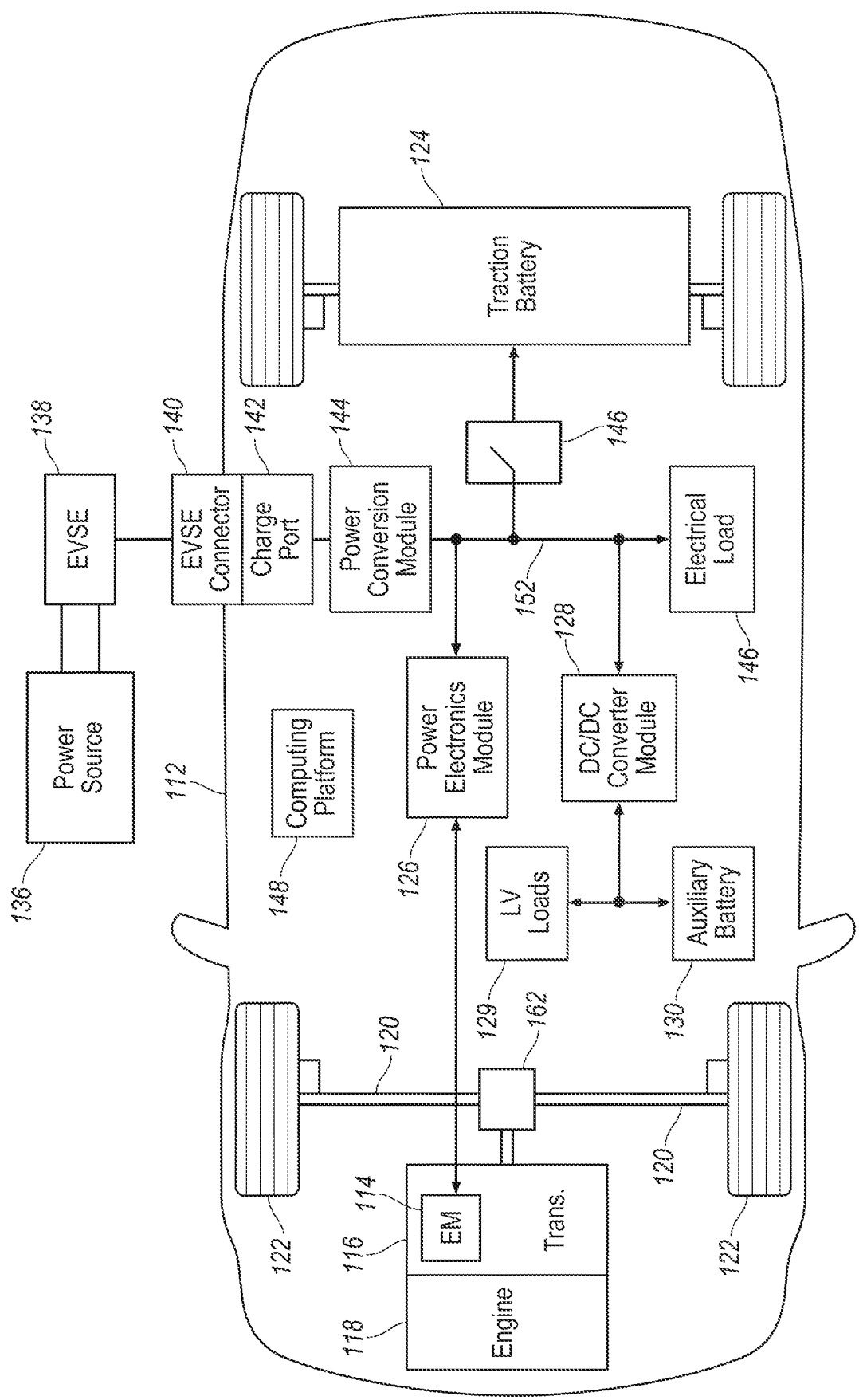
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV), a battery electric vehicle (BEV), and/or full hybrid electric vehicle (FHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. The electrified vehicle 112 may also be a BEV. In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (such as a traction inverter). The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads 129. An output of the DC/DC converter module 128 may be electrically coupled to an auxiliary battery 130 (e.g., 12V battery) for charging the auxiliary battery 130. The low-voltage systems may be electrically coupled to the auxiliary battery 130.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 142 of the vehicle 112. The charge port 142 may be any type of port configured to transfer power from the EVSE 138 to the vehicle 112. The charge port 142 may be electrically coupled to a charger or on-board power conversion module 144. The power conversion module 144 may condition the power supplied from the EVSE 138 to provide the proper voltage and current levels to the traction battery 124. The power conversion module 144 may interface with the EVSE 138 to coordinate the delivery of power to the vehicle 112. The EVSE connector 140 may have pins that mate with corresponding recesses of the charge port 142. Alternatively, various components described as being electrically coupled or connected may transfer power using a wireless inductive coupling. Additionally, the charge port 142 may be configured to output DC electric power from the traction battery 124 through the power conversion module 144. One or more contactors 146 may isolate the traction battery 124 from other components when opened and connect the traction battery 124 to other components when closed.

Electronic modules/controllers in the vehicle 112 may communicate via one or more vehicle networks (to be described in detail below). The vehicle network may include a plurality of channels for communication. Channels of the vehicle network may include discrete connections between modules and may include power signals from the auxiliary battery 130. Different signals may be transferred over different channels of the vehicle network. For example, video signals may be transferred over a high-speed channel while control signals may be transferred over a low speed channel. The vehicle network may include any hardware and software components that aid in transferring signals and data between modules. A computing platform 148 may be present to perform and coordinate various operations of the vehicle 112.

Figure 2:
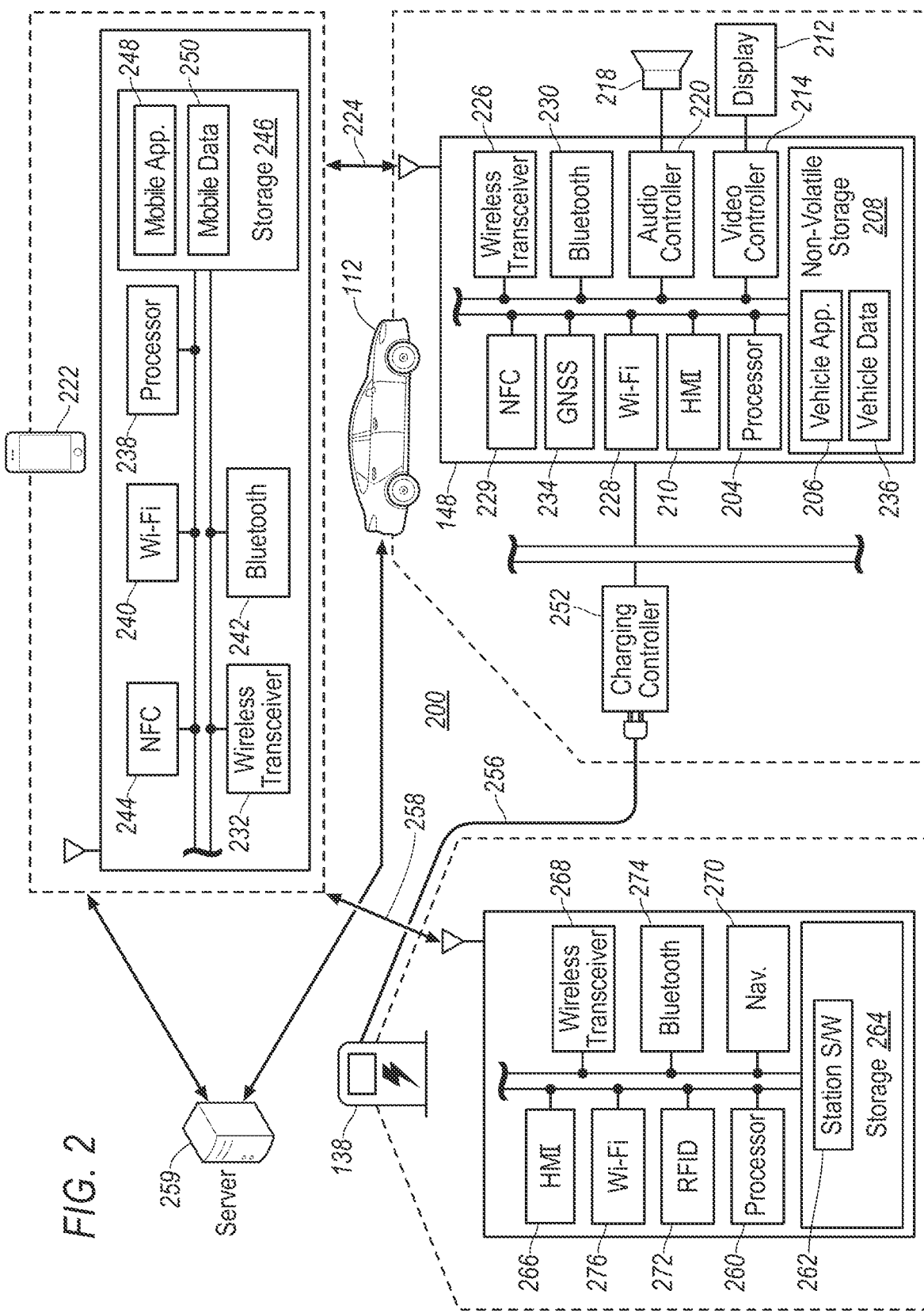
FIG. 2 is a block topology of a vehicle charging system.

FIG. 2 is a block topology 200 of the vehicle charging system. A computing platform 148 of the vehicle 112 may include one or more processors 204 configured to perform instructions, commands, and other routines in support of the processes described herein. For instance, the computing platform 148 may be configured to execute instructions of vehicle applications 206 to provide features such as navigation, satellite radio decoding, and charging control. Such instructions and other data may be maintained in a non-volatile manner using a variety of types of computer-readable storage medium 208. The computer-readable medium 208 (also referred to as a processor-readable medium or storage) includes any non-transitory medium (tangible medium) that participates in providing instructions or other data that may be read by the processor 204 of the computing platform 148. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 148 may be provided with various features allowing the vehicle occupants/users to interface with the computing platform 148. For example, the computing platform 104 may receive input from human-machine interface (HMI) controls 210 configured to provide for occupant interaction with the vehicle 112. As an example, the computing platform 148 may interface with one or more buttons (not shown) or other HMI controls (e.g., steering wheel audio buttons, a push-to-talk button, instrument panel controls, etc.) configured to invoke functions on the computing platform 148 as well as other components of the vehicle 112.

The computing platform 148 may also drive or otherwise communicate with one or more displays 212 configured to provide visual output to vehicle occupants by way of a video controller 214. In some cases, the display 212 may be a touch screen further configured to receive user touch input via the video controller 214, while in other cases the display 212 may be a display only, without touch input capabilities. The computing platform 104 may also drive or otherwise communicate with one or more speakers 218 configured to provide audio output to vehicle occupants by way of an audio controller 220.

The computing platform 148 may be configured to communicate with a mobile device 222 of the vehicle user via a wireless connection 224. The mobile device 222 may be any of various types of portable computing device, such as cellular phones, tablet computers, smart watches, laptop computers, portable music players, key fobs, or other devices capable of communication with the computing platform 148. In many examples, the computing platform 148 may include a wireless transceiver 26 in communication with a Wi-Fi controller 228, a near-field controller (NFC) 229, a Bluetooth controller 230, and other controllers such as a Zigbee transceiver, an IrDA transceiver, an RFID transceiver (not shown), and configured to communicate with a compatible wireless transceiver 232 of the mobile device 222. The computing platform 148 may be further provided with location services via a global navigation satellite system (GNSS) controller 234 configured to determine the location of the vehicle 112 and plan navigation routes. For instance, the GNSS controller 234 may be configured to support the global positioning system (GPS) as an example. The navigation software may be stored in the non-volatile storage 208 as a part of the vehicle applications 206. The map data used for route planning may be also stored in the non-volatile storage 208 as a part of vehicle data 236.

The mobile device 222 may be provided with a processor 238 configured to perform instructions, commands, and other routines in support of the processes such as calling, wireless communication, multi-media processing and digital authentication. The wireless transceiver 232 of the mobile device 222 may be in communication with a Wi-Fi controller 240, a Bluetooth controller 242, an NFC controller 244, and other controllers configured to communicate with the compatible wireless transceiver 226 of the computing platform 148. The mobile device 222 may be provided with a non-volatile storage 246 configured to store various software and data. For instance, the non-volatile storage 246 may store mobile applications 248 and mobile data 250 to enable various features of the mobile device 222.

The computing platform 148 may be further configured to communicate with a charging controller 252 via one or more in-vehicle networks 254. The in-vehicle network 254 may include, but is not limited to, one or more of a controller area network (CAN), an Ethernet network, an ultra-wide band (UWB), and a media-oriented system transport (MOST), as some examples.

The charging controller 252 of the vehicle 112 may be configured to control the charging of the vehicle battery 124. The charging controller 252 may be configured to communicate with the EVSE 138 (charging station) to coordinate the vehicle charging via a charging cable 256 in support of data communications. Alternatively, the charging controller 252 may be configured to communicate with the EVSE 138 via a wireless connection (not shown). Additionally or alternatively, the system may be configured to communicate the vehicle information to the EVSE 138 using the mobile device 222 through a wireless connection 258 with or without the involvement of the vehicle charging controller 252. The vehicle 112 and the mobile device 222 may be further configured to communicate with a remote server 259 via the respective wireless transceiver to obtain various information.

The EVSE 138 may include one or more processors 260 configured to perform instructions, commands, and other routines in support of the processes described herein. As an example, the EVSE 138 may be configured to execute instructions of station software 262 stored in a storage 264 to provide functions such as activating/deactivating charging, price selection, processing payment, and wireless communication with various digital entities. The EVSE 138 may be provided with HMI controls 266 configured to provide interaction with user.

The EVSE 138 may include a wireless transceiver 268 in communication with a NFC controller 270, a radio-frequency identification (RFID) controller 272, a Bluetooth controller 274 a Wi-Fi controller 276, and other controllers configured to communicate with compatible wireless transceiver 226 of the vehicle 112, and/or compatible wireless transceiver 232 of the mobile device 222.

Figure 3:
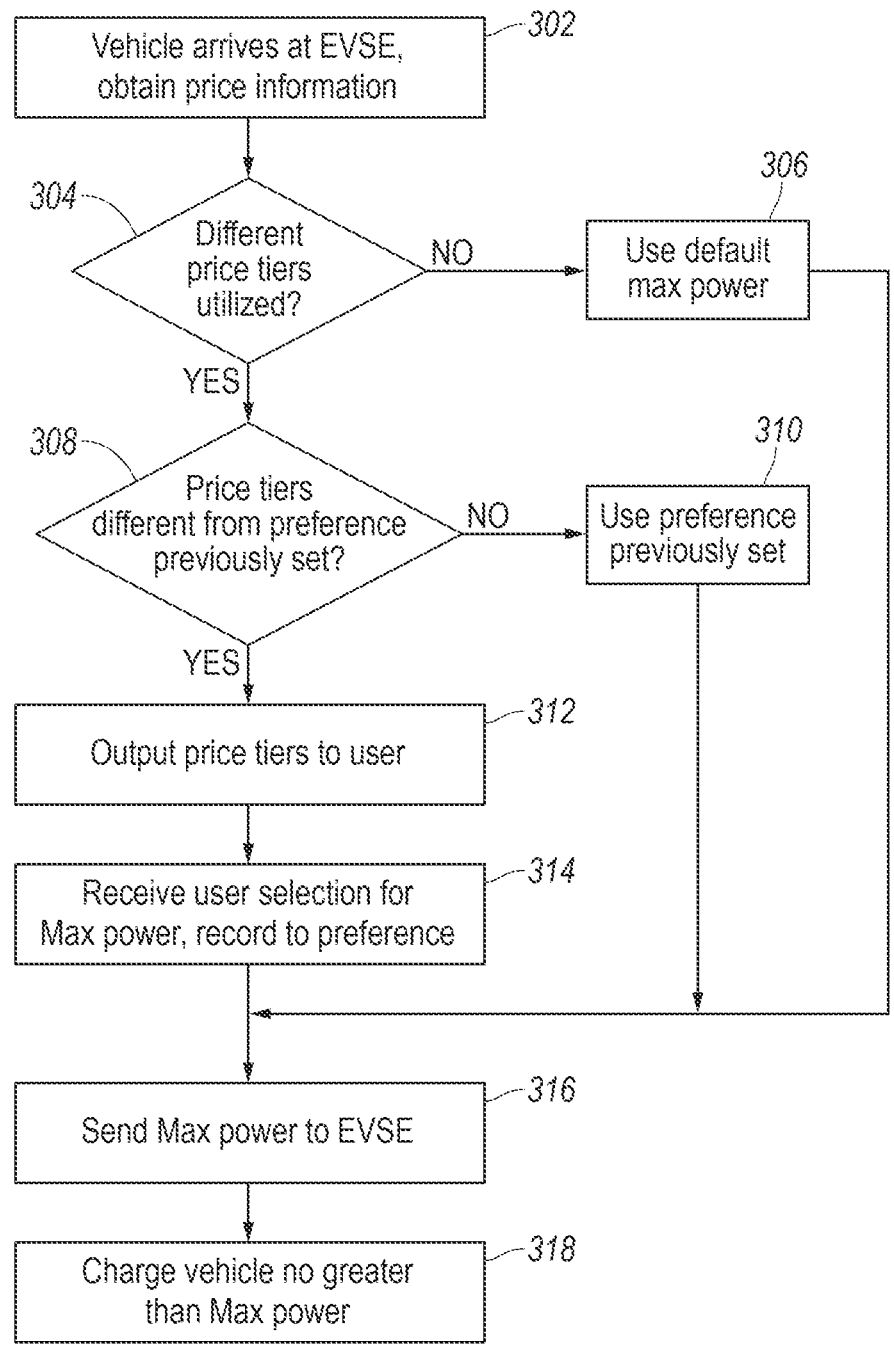
FIG. 3 is a flow diagram for a vehicle charging process.

Referring to FIG. 3, an example flow diagram for a vehicle charging process 300 is illustrated. With continuing reference to FIGS. 1 and 2, the process 300 may be implemented by the vehicle 112 to facilitate a price tier selection to balance the charging cost and charging power/time. For instance, the EVSE 138 may be configured to support multiple price tiers for different vehicle maximum charging power. In general, a higher maximum charging power may incur a higher charging price per unit, and a lower maximum charging power may incur a lower charging price per unit. The EVSE 138 may be configured to obtain the maximum charging power from the vehicle 112 via the charging controller 252 and/or the computing platform 148 and determine the charging price for the vehicle using the maximum power received. Alternatively, the EVSE 138 may be configured to obtain the maximum power information from the mobile device 222 of the vehicle user without directly communicating with the vehicle 112. In reality, the vehicle 112 may charge the battery 124 at a lower charging power to preserve the lifespan of the battery 124. However, the vehicle 112 may still be classified as a higher price tier and pay a price premium due to the high maximum power reported to the EVSE 138. The process 300 allows the user of the vehicle 112 to adjust the maximum charging power to make the present charge eligible for a lower price tier. The process 300 may be implemented via the computing platform 148 individually or in combination with other components of the system (e.g., the charging controller 252 and/or the mobile device 222). Alternatively, the process 300 may be implemented via the charging controller 252 and/or the mobile device individually or in combination thereof. For simplicity purposes, the following description will be made with reference to the computing platform 148 as an example.

At operation 302 responsive to detecting the vehicle has arrived at the EVSE 138 to charge the battery 124, the computing platform 148 obtains price information for the EVSE 138. There may be various ways that the computing platform 148 may obtain the price information. For instance, the computing platform 148 may use a current vehicle location from the GNSS controller 234 to identify the EVSE 138, and obtain the price information of the EVSE 138 from the remote server 259. Alternatively, the computing platform 148 may obtain the price information directly from the EVSE 138 via the charging cable 256 and/or a wireless connection. At operation 304, the computing platform 148 determines if the present EVSE 138 utilized different price tiers corresponding to different maximum charging power. Depending on the local regulation and policies of the utility companies, some EVSEs may be configured to support the multiple price tiers fee structure, whereas others may utilize a universal price structure without differentiating the price tiers. If the current EVSE 138 does not support the multiple price tiers structure, the process proceeds to operation 306 and the computing platform 148 uses the default maximum power to report to the EVSE 138. The default maximum power may be a preset maximum charging power that the hardware of the vehicle 112 is capable to support.

If the computing platform determines the EVSE 138 supports multiple price tier structure, the process proceeds to operation 308 to further determine if the price tiers of the current EVSE 138 are different from those of a vehicle preference previously set. Although multiple EVSEs may utilize the same price tier structure, the specific price for different maximum charging power may vary by jurisdiction (e.g., states, provinces, cities) and utility provider. The computing platform 148 may store a charging preference as a part of vehicle data 236 in the non-volatile storage 208. The charging preference 236 may include one or more adjusted max charging power set by the user corresponding to one or more price tiers that the vehicle 112 previously encountered. If the price tiers for the current EVSE 138 are the same as one of the multiple price tiers stored in the storage 208 as a part of the charging preference 236, the process proceeds to operation 310 and the computing platform 148 may directly select the previously adjusted maximum power corresponding to the price tiers of the current EVSE 138. Additionally or alternatively, the two price tiers may not match exactly. The computing platform 148 may determine the current price tiers as being the same as one of the multiple price tiers of the charging preference 236 as long as the price difference is within a threshold (e.g., ±$0.2 per unit). Otherwise, if the price tiers of the current EVSE 138 are new to the vehicle 112, the process proceeds to operation 312 and the computing platform 148 outputs a message to the vehicle user to report the multiple price tiers and ask for user input selection via the HMI controls 210. The message may include the price per unit of electricity corresponding to the maximum charging power for each tier. The message may further include a total amount of price to pay and an estimated time to finish the charging. Table 1 below illustrates an example of the message that the computing platform 148 may present to the user.

TABLE 1

Price tier table presented to the user for a total amount of 50 kWh charge.

| Tier | Max Power (kW) | Price ($/min) | Average Power (kW) | Total price ($) | Est time (min) |
|---|---|---|---|---|---|
| 1 | 50 | 0.21 | 50 | 12.6 | 60 |
| 2 | 125 | 0.58 | 72 | 23.2 | 42 |
| 3 | 350 | 0.89 | 75 | 35.6 | 40 |

In the present example, three price tiers are utilized by the EVSE 138. Tier 1 corresponds to a price per minute for a 50 kW maximum charging power; Tier 2 corresponds to a price per minute for a 125 kW maximum charging power; and Tier 3 corresponds to a price per minute for a 350 kW maximum charging power. In reality, the actual and average charging power may be limited significantly below the maximum charging power due to various reasons. For instance, the user may manually limit the actual charging power to a 75 kW maximum to reduce battery cell deterioration that is usually caused by the heat generated by fast charging. Alternatively, even no manual limitation is input by the user, the EVSE 138 may start with a high charging power near the maximum power at the beginning of the process and gradually reduce the charging power to a lower steady level as the SOC of the battery 124 increases. As illustrated in Table 1, the average charging power of Tier 2 and Tier 3 are 72 kW and 75 kW—significantly lower than the maximum charging power assigned to the tiers. It should be noted that the numbers in Table 1 merely illustrate an example, and different figures and configurations may be used under substantially the same principle. It should be further noted that although the price per unit in the present example is illustrated using price per minute, other units may be used instead. For instance, each tier may correspond to a price per kW configuration in other examples.

If the display 212 is provided with touch screen capability, the user may select one of the price tiers simply by touching the touch screen 212. Otherwise, the user may use other input devices to indicate his/her intent of selection. Additionally, the computing platform 148 may be configured to allow a user to manually input a desired charging power and automatically select the corresponding price tier based on the user input. For instance, in response to a user input of 100 kW desired charging power, the computing platform 148 may automatically select Tier 2 for the vehicle 112. The user may prefer a lower desired charging power to preserve the battery life (i.e., lower charge power may cause less battery degradation). Alternatively, the computing platform 148 may be further configured to allow the user to manually input a desired charging time based on which desired charging power may be automatically determined. Responsive to receiving the user selection at operation 314, the computing platform 148 may record the selected price tier and/or desired charging power as the charging preference 236 for future reference. Alternatively, if the computing platform 148 determines the user specified time is within a tolerance (e.g., 10 min) of a time from charging at a lower power that would yield a cost savings higher than a tolerance (e.g., $5), the computing platform 148 may further provide the lower charging power to the user as an option and let the user make a choice between the user specified charging power or the lower charging power.

At operation 316, the computing platform 148 sends the price tier as selected or determined to the EVSE 138. At operation 318, the computing platform 148 monitors the vehicle charging at a power no greater than the maximum charging power corresponding to the price tier as selected.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle, comprising:
   a traction battery;
   a human-machine interface (HMI); and
   a controller programmed to
      responsive to detecting electric vehicle supply equipment (EVSE) utilizing multiple price tiers corresponding to multiple default maximum charge powers, output a message indicating a charge price corresponding to the default maximum charge power for each of the price tiers via the HMI,
      responsive to receiving user input defining an adjusted maximum charge power different than the default maximum charge powers and less than a greatest of the default maximum charge powers, send the adjusted maximum charge power to the EVSE and permit charging from the EVSE at or below the adjusted maximum charge power, and
      responsive detecting a vehicle charge preference matching one of the multiple price tiers of the EVSE, automatically select a previously set maximum charge power and send the previously set maximum charge power to the EVSE.

2. The vehicle of claim 1, wherein the vehicle charge preference matches one of the price tiers when a charge price difference between the charge preference and price for each tier is within a price threshold.

3. The vehicle of claim 1, wherein the controller is further programmed to record the adjusted maximum charge power.

4. The vehicle of claim 1, wherein the controller is further programmed to, responsive to detecting the EVSE utilizing a universal price structure, automatically select the default maximum charge power and send the default maximum charge power to the EVSE.

5. A method comprising:
in a presence of electric vehicle supply equipment (EVSE) utilizing multiple price tiers corresponding to multiple default maximum charge powers, outputting a message indicating a charge price corresponding to the default maximum charge power for each of the price tiers;
receiving input indicating a user specified adjusted maximum charge power different than the default maximum charge powers;
permitting charging from the EVSE at or below the adjusted maximum charge power; and
automatically selecting a previously set maximum charge power and sending the previously set maximum charge power to the EVSE responsive to detecting a vehicle charge preference matching one of the multiple price tiers of the EVSE.

6. The method of claim 5, wherein the vehicle charge preference matches one of the price tiers when a charge price difference between the charge preference and price for each tier is within a price threshold.

7. The method of claim 5 further comprising sending the adjusted maximum charge power to the EVSE.

8. The method of claim 6 further comprising recording the adjusted maximum charge power.

9. The method of claim 5 further comprising automatically selecting the default maximum charge power and sending the default maximum charge power to the EVSE responsive to detecting the EVSE utilizing a universal price structure.

10. A charge system comprising:
a controller programmed to
control charging from a charge station based on a user defined adjusted maximum charge power different than default maximum charge powers available from the charge station,
output a message that the charge station is utilizing a plurality of price tiers corresponding to the default maximum charge powers and indicating a charge price corresponding to each of the price tiers, and receive user input defining the user defined adjusted maximum charge power, and
automatically select a previously set maximum charge power and send the previously set maximum charge power to the charge station responsive to detecting a vehicle charge preference matching one of the multiple price tiers of the charge station.

11. The charge station of claim 10, wherein the vehicle charge preference matches one of the price tiers when a charge price difference between the charge preference and price for each tier is within a price threshold.

12. The charge station of claim 10, wherein the controller is further programmed to send the adjusted maximum charge power to the charge station.

13. The charge station of claim 10, wherein the controller is further programmed to record the adjusted maximum charge power.

14. The charge station of claim 10, wherein the controller is further programmed to automatically select the default maximum charge power and send the default maximum charge power to the charge station responsive to detecting the charge utilizing a universal price structure.

* * * * *